United States Patent [19]

Baba

[11] Patent Number: 5,067,631

[45] Date of Patent: Nov. 26, 1991

[54] PART ISOLATING APPARATUS

[75] Inventor: Tsuyoshi Baba, Yokohama, Japan

[73] Assignee: Canon Kabushiki Kaisha, Tokyo, Japan

[21] Appl. No.: 442,858

[22] Filed: Nov. 29, 1989

[30] Foreign Application Priority Data

Dec. 5, 1988 [JP] Japan .......................... 63-157621[U]
Oct. 6, 1989 [JP] Japan .......................... 1-117156[U]

[51] Int. Cl.⁵ .......................................... A24F 15/04
[52] U.S. Cl. .................................. 221/254; 414/754
[58] Field of Search ............... 221/254, 211; 414/225, 414/226, 6, 7, 754; 198/396, 443, 468.8

[56] References Cited

U.S. PATENT DOCUMENTS

| | | | |
|---|---|---|---|
| 541,853 | 7/1895 | Hart | 221/254 |
| 4,369,874 | 1/1983 | Kettner et al. | 198/396 |
| 4,712,974 | 12/1987 | Kane | 414/754 |
| 4,938,654 | 7/1990 | Schram | 414/225 |

FOREIGN PATENT DOCUMENTS 2234441 1/1974 Fed. Rep. of Germany ...... 198/443

Primary Examiner—Robert P. Olszewski
Assistant Examiner—Kenneth Noland
Attorney, Agent, or Firm—Fitzpatrick, Cella, Harper & Scinto

[57] ABSTRACT

An apparatus for isolating a plurality of parts is operable, with, e.g., an image recognizing apparatus which records the position and configuration of the parts, and a conveying and placing apparatus used to align the parts on a part alignment section. The part isolating apparatus includes an isolation table having a centrally located bore defined by a surface sloping downwardly toward the center of the table, and a frame member for supporting the table. A bag member is mounted around the lower edge of the table for receiving a plurality of parts and includes an isolation frame for holding a part to be isolated. A thrusting head vertically lifts the bottom of the bag member. When the thrusting head ascends through the bore, one of the parts becomes isolated from the others. Another form of the part isolating apparatus comprises a bag member receiving a plurality of parts, a frame for supporting the bag member, and an isolation frame mounted on a lower inner surface of the bag member for supporting an isolated part. An ascending device raises and lowers the isolation frame from a position wherein the bag member is suspended to a position wherein the bag member is inverted. The part isolated from the others is supported by the isolation frame at its ascended position. The apparatus is capable of isolating parts and aligning their attitude, regardless of the varying type or shape of the parts.

24 Claims, 10 Drawing Sheets

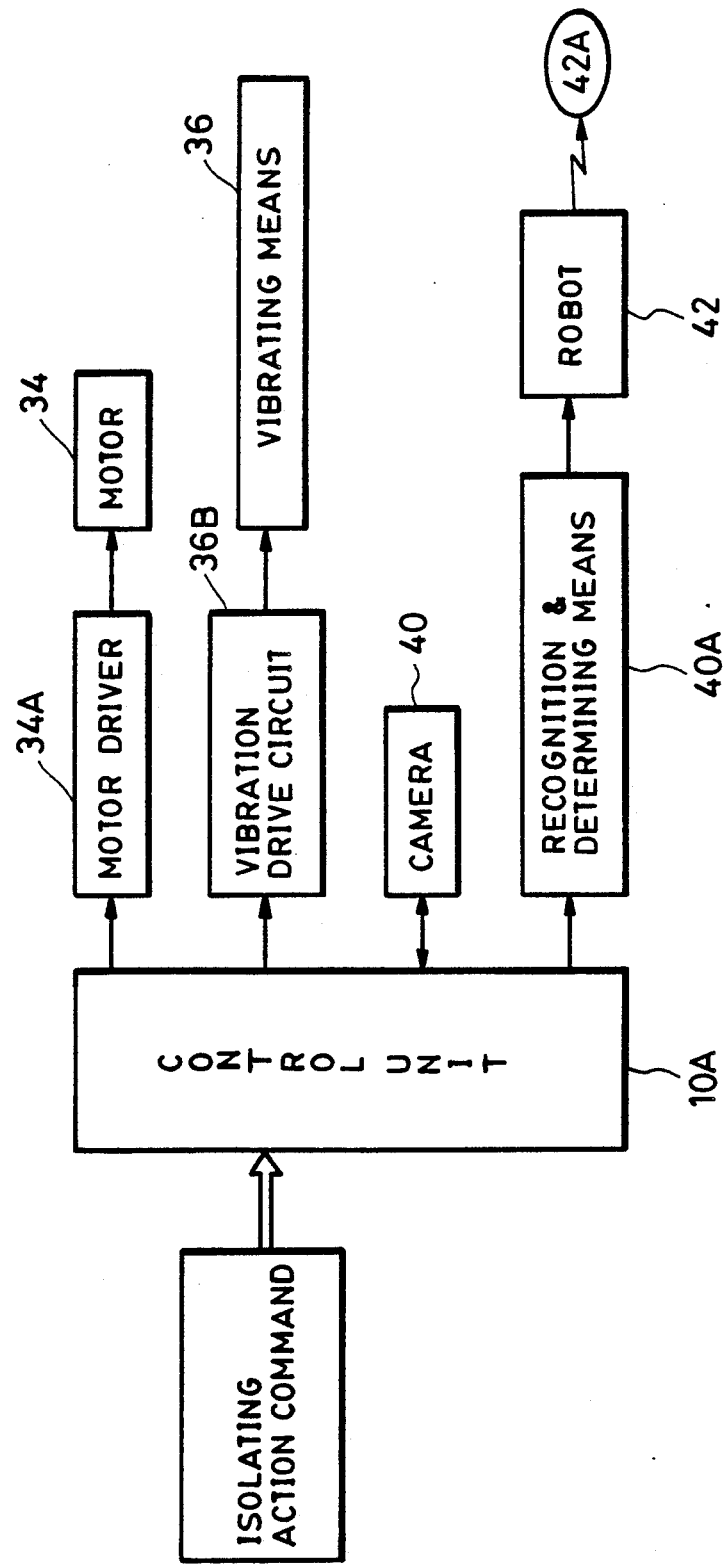

PART ISOLATING APPARATUS

BACKGROUND OF THE INVENTION

1. Field of the Invention

The present invention relates to an apparatus for individually isolating each of a plurality of parts. The device can be used with, e.g., an image recognizing apparatus that identifies the parts based on their position and configuration, to allow a conveying and placing apparatus to align the parts on an alignment section of a magazine or tape.

2. Description of the Prior Art

Typical examples of part isolating apparatuses which have hitherto been used include a part feeder and a vibration feeder which utilizes vibrations. Such conventional apparatuses are provided with portions designed to correspond to each of the plurality of parts handled thereby. For instance, a conventional part feeder is provided with means for orienting each part, whereas a conventional vibration feeder is provided with holes for fitting each part being vibration-fed. Thus, a conventional part isolating apparatus is rendered capable of feeding parts positioned in a desired attitude.

Such conventional part isolating apparatuses, however, involve the following problems. The parts handled by the apparatus occupy, for their own use, a relatively large portion of the apparatus. Accordingly, depending on the type of part to be handled, it can be difficult to isolate the portion that is to be exclusively occupied by the part. As a result, the reliability exhibited by the apparatus varies with the type of parts handled. For this reason, it has hitherto been necessary to prepare different types of part isolating apparatuses for different types of parts. What is more, there have been certain parts that cannot be aligned or fed by conventional part isolating apparatuses.

SUMMARY OF THE INVENTION

In accordance with one aspect of the present invention, a part isolating apparatus comprises an isolation table having an upper surface and a lower surface, with the upper surface having an upper edge portion defining an opening and the lower surface having a lower edge portion defining an opening. The table includes a bore extending from the upper edge portion to the lower edge portion, and being defined by a sloping surface sloping inwardly toward the lower edge portion. Bag means, mounted around the lower edge portion of the lower surface and disposed beneath the isolation table, receives therein a plurality of parts to be isolated when the bag means is lifted through the bore. Thrusting means is disposed beneath the bag means and lifts the bag means through the bore to isolate at least one of the parts.

In accordance with another aspect of the present invention, a part isolating apparatus comprises a bag member for receiving a plurality of parts, with the bag member having a bottom portion and an upper edge portion, frame means for supporting the bag member, and an isolation frame mounted on a lower inner surface of the bag member for supporting a part to be isolated. Moving means, supported by the frame means, raises and lowers the isolation frame between a descended position, wherein the bag member is suspended, and an ascended position, wherein the bag member is inverted and the isolated part is supported by the isolation frame.

BRIEF DESCRIPTION OF THE DRAWINGS

FIG. 2B is a block diagram showing the control of the apparatus shown in FIG. 1;

DESCRIPTION OF THE PREFERRED EMBODIMENTS

A part isolating apparatus in accordance with one embodiment of the present invention will now be described in detail with reference to FIGS. 1 to 4.

Figure 1:
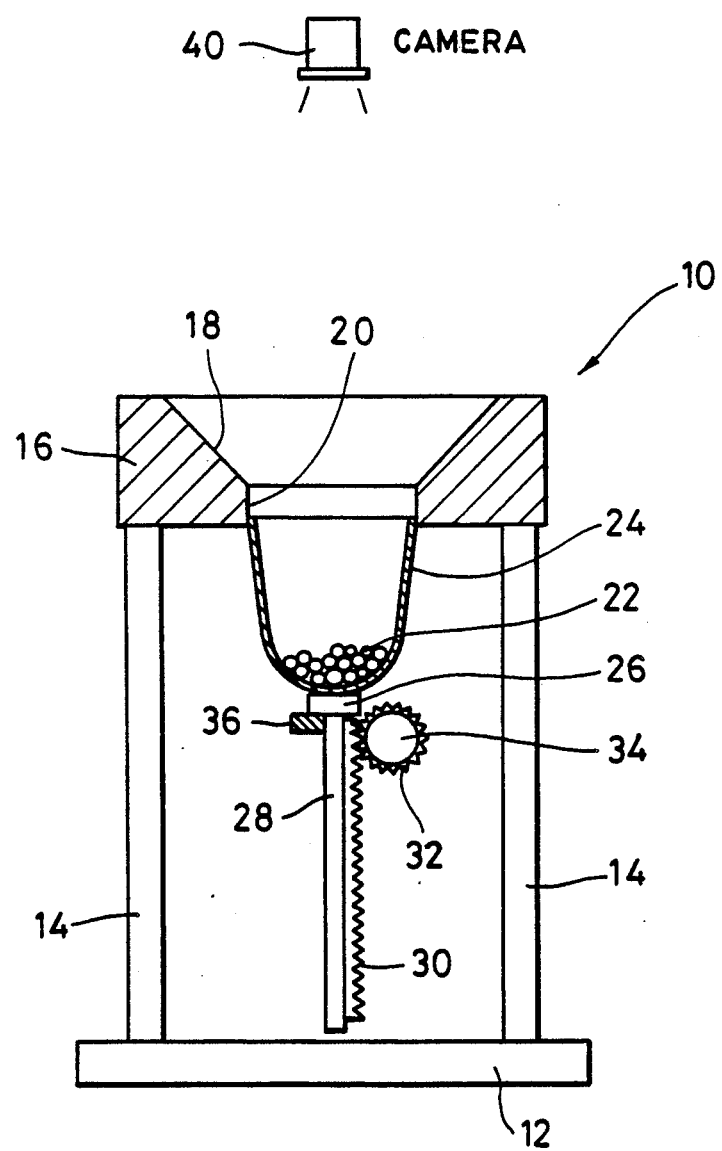
FIG. 1 is a front sectional view showing the structure of a part isolating apparatus which is one embodiment of the present invention.

As shown in FIG. 1, a part isolating apparatus 10 in accordance with this embodiment includes a base 12 disposed above a foundation (not shown), and a plurality of columns 14 supporting an isolation table 16 above the base 12 As shown in FIG. 1, the upper surface of the isolation table 16 forms an inverted-cone-shaped slope 18 declining inwardly toward the center of the table 16. A circular bore 20 is formed through the center of the table 16.

Figure 3:
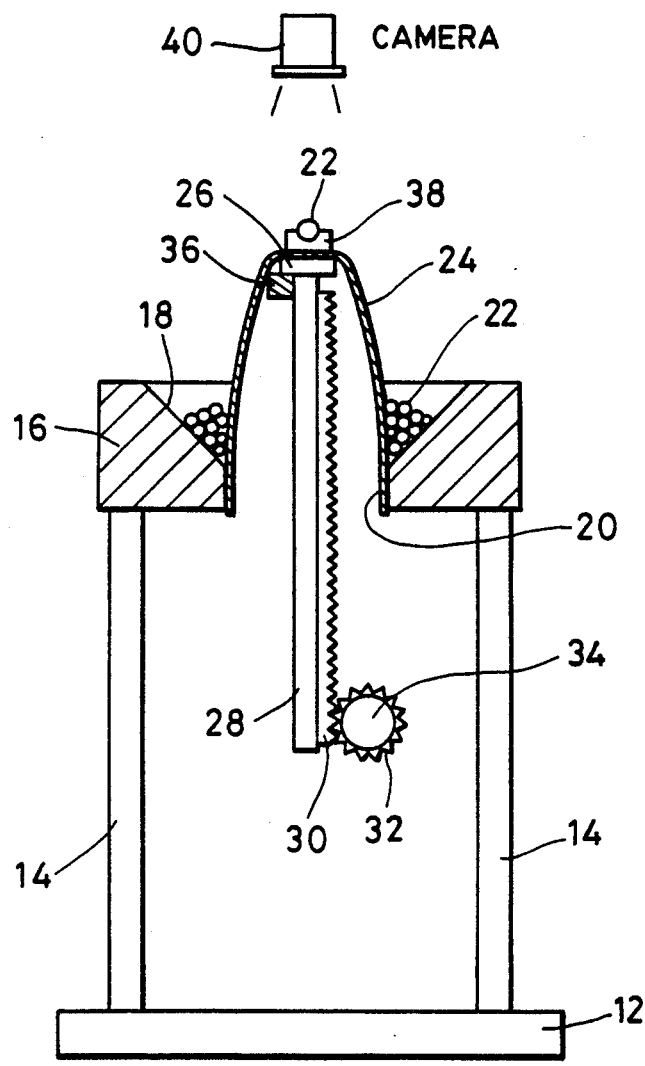
FIG. 3 is a view corresponding to FIG. 1, showing a state where a part is isolated.

A bag member 24 formed of, e.g., a piece of cloth is mounted around the edge at the lower end of the bore 20, so as to receive therein a plurality of parts 22 charged through the bore 20. The piece of cloth forming the bag member 24 is sufficiently soft so that the bag member 24 with the parts 22 received therein maintains a state in which the bag member 24 is suspended from the lower end of the bore 20, as shown in FIG. 1, so long as no force acts upwardly on the bag member 24 from below. The dimensions of the bag member 24 and the bore 20 are so set that, when a certain force acts upwardly on the bag member 24 from below, the central portion of the bag member 24 is lifted through the bore 20 until it is positioned above the bore 20, as shown in FIG. 3.

A thrusting head 26 is provided in such a manner as to be positioned immediately below the suspended bag member 24 when the member 24 receives therein the plurality of parts. The thrusting head 26 is secured to the upper end of a vertically moving driving rod 28. A vertically extending rack 30 is provided on one side of the driving rod 28, with a pinion gear 32 being in meshing engagement with the rack 30. The pinion gear 32 is coaxially fixed around the drive shaft of a motor 34 which is in turn mounted to the base 12 through a stay, not shown. With the above-described construction, the thrusting head 26 vertically reciprocates in response to the driving of the motor 34.

Figure 4:
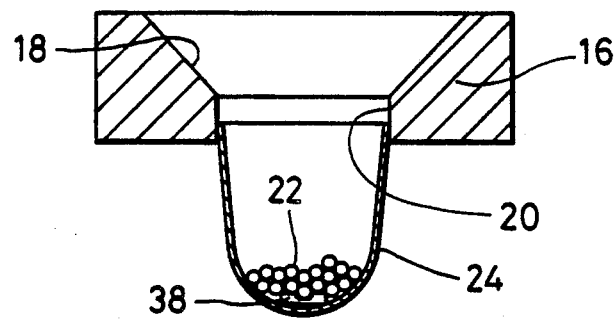
FIG. 4 is a fragmentary front sectional view showing the way in which an isolation frame of the apparatus shown in FIG. 1 is disposed in a bag member of the apparatus.

A vibrating means 36 is connected to an upper end portion of the driving rod 28 so as to vibrate the thrusting head 26. Further, as shown in FIG. 4, an isolation frame 38 is detachably mounted within the bag member 24 and is positioned at a central location of the bottom of the bag member 24. The isolation frame 38 has a recess already formed in the upper surface thereof. The recess corresponds to parts 22 of one certain type, and it has a configuration which complimentarily fits the configuration of one of such parts 22 in a predetermined attitude. A plurality of isolation frames can be prepared to correspond with different types of parts 22 which the apparatus is capable of handling. Each time the type of parts 22 to be charged into the bag member 24 changes, the isolation frame 38 can be changed to correspond to the new part.

At a position above the isolation table 16, an image recognizing camera 40 is provided to check, by image processing, a part 22 isolated on the isolation frame 38. As shown in FIG. 2B, the camera 40 is connected, via a control unit 10A, to an image recognition and determining means 40A which recognizes the image of an isolated part 22 and makes determinations such as the state in which the part 22 is isolated and the attitude of the part.

Figure 2A:
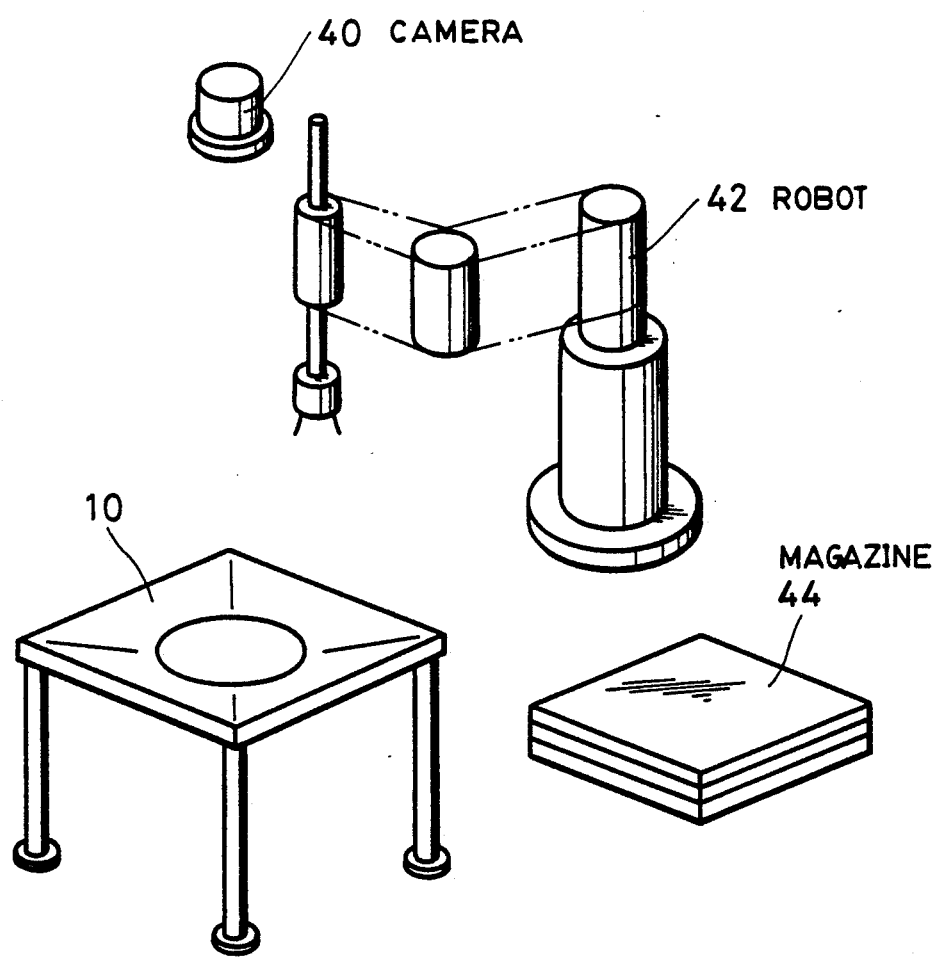
FIG. 2A is a perspective view showing the part isolating apparatus shown in FIG. 1, together with a camera, a robot and a magazine.

On the other hand, as shown in FIG. 2A, a robot 42 serving as a part conveying and placing apparatus is provided beside the part isolating apparatus 10 having the above-described construction, so as to handle a part 22 isolated by the part isolating apparatus 10 and then convey the part 22 to an alignment section such as a magazine 44 or a feed tape, not shown.

FIG. 2B is a block diagram illustrating the control of this embodiment. The control unit 10A controls the above-described motor 34, the vibrating means 36, the camera 40, and the recognition and determining means 40A. The motor 34 and the vibrating means 36 receive signals from a motor driver 34A and a vibration drive circuit 36B, respectively.

A description will be given of the operation of the part isolating apparatus 10 by which one of a plurality of parts 22 is isolated from the others, and has its attitude set to a predetermined attitude.

First, an isolation frame 38 corresponding to a plurality of parts 22 which are of the same type and which are to be subjected to a series of isolating actions is mounted within the bag member 24 on its bottom portion. Subsequently, the plurality of parts 22 of that certain type are charged into the bag member 24 with the isolation frame 38 mounted therein, as shown in FIG. 1. Upon the achievement of the condition shown in FIG. 1, an isolating action command is input to the control unit 10A, whereby an isolating action is entered.

First in the isolating action, the control unit 10A supplies a command signal in response to which the vibration drive circuit 36B outputs a vibration signal whereby the vibrating means 36 is actuated, and starts vibrating the thrusting head 26. The control unit 10A also supplies a command signal in response to which the motor driver 34A is energized to actuate the motor 34.

The motor 34 causes, through the meshing engagement of the pinion gear 32 with the rack 30, the ascending of the driving rod 28, hence, the ascending of the thrusting head 26. As the thrusting head 26 ascends, it lifts the bottom portion of the bag member 24 through the bore 20 until the bottom portion of the bag member 24 is positioned above the isolation table 16. Until the achievement of this position, all the parts 22 but the one received in the recess of the isolation frame 38 roll down to stay in a space between the free portion of the bag member 24 and the slope 18 of the isolation table 16, as shown in FIG. 3. In this way, one of the plurality of parts 22 becomes isolated from the others.

While this isolating action is being executed, the control unit 10A continues to output a vibration command whereby the vibrating means 36 continuously vibrates the thrusting head 26. As a result, the isolated part 22 disposed in the recess of the isolation frame 38 is forced, by the vibration transmitted through the isolation frame 38, to assume a predetermined attitude that fits the configuration of the recess. Thus, the part 22 is isolated, with its attitude set to a predetermined attitude.

When one of the plurality of parts 22 has been isolated in this way by the part isolating apparatus 10, it is photographed by the image recognizing camera 40. The image obtained by the camera 40 is used by the recognition and determining means 40A to ascertain whether one and only one of the parts 22 has been isolated from the others, and whether that one part has been isolated with a correct attitude. When the means 40A determines that only one of the parts 22 has been isolated and has assumed a correct attitude, a signal indicative of this determination is output. In response to this signal, the robot 42 takes out the one part and conveys it to,.e.g., a magazine 44, in which the part is received.

When the part-conveying action of the robot 42 is completed, a conveyance completion signal is supplied from the robot 42 to the control unit 10A. In response to this signal, the motor driver 34A outputs a signal whereby the motor 34 rotates in the reverse direction. By this rotation, the thrusting head 26 is caused to descend until it again assumes the position shown in FIG. 1. As a result, the remaining parts 22 which have stayed on the isolation table 16 roll down the declining slope 18, pass through the bore 20, and drop back into the bag member 24. Thereafter, another isolating action is effected, so that another part 22 among the remaining parts 22 is isolated from the others in a similar manner.

Thus, according to this embodiment, each of a plurality of parts 22 of the same type can be isolated from the others with a predetermined attitude.

In this embodiment, when the type of parts to be handled changes, the isolation frame 38 is replaced with a new frame that corresponds to the new type of part. Therefore, the replacing operation can be performed with ease and efficiency.

Also in this embodiment, in contrast with a conventionally-used part feeder or vibration feeder, the parts handled occupy a relatively small portion of the part isolating apparatus. Accordingly, the portion of the apparatus which has to be designed to correspond with each part is relatively small, and the apparatus can be easily adjusted to handle various types of parts. This feature reduces the cost of the apparatus.

Various modifications may of course be made in the foregoing embodiment of the present invention without departing from the scope of the present invention.

Another part isolating apparatus 50 in accordance with another embodiment of the present invention will be described with reference to FIGS. 5A and 5B to FIG. 9. In the following description of this embodiment, the component parts corresponding to those of the first embodiment are denoted by corresponding reference numerals, and descriptions of these component parts will be omitted.

Figure 5A:
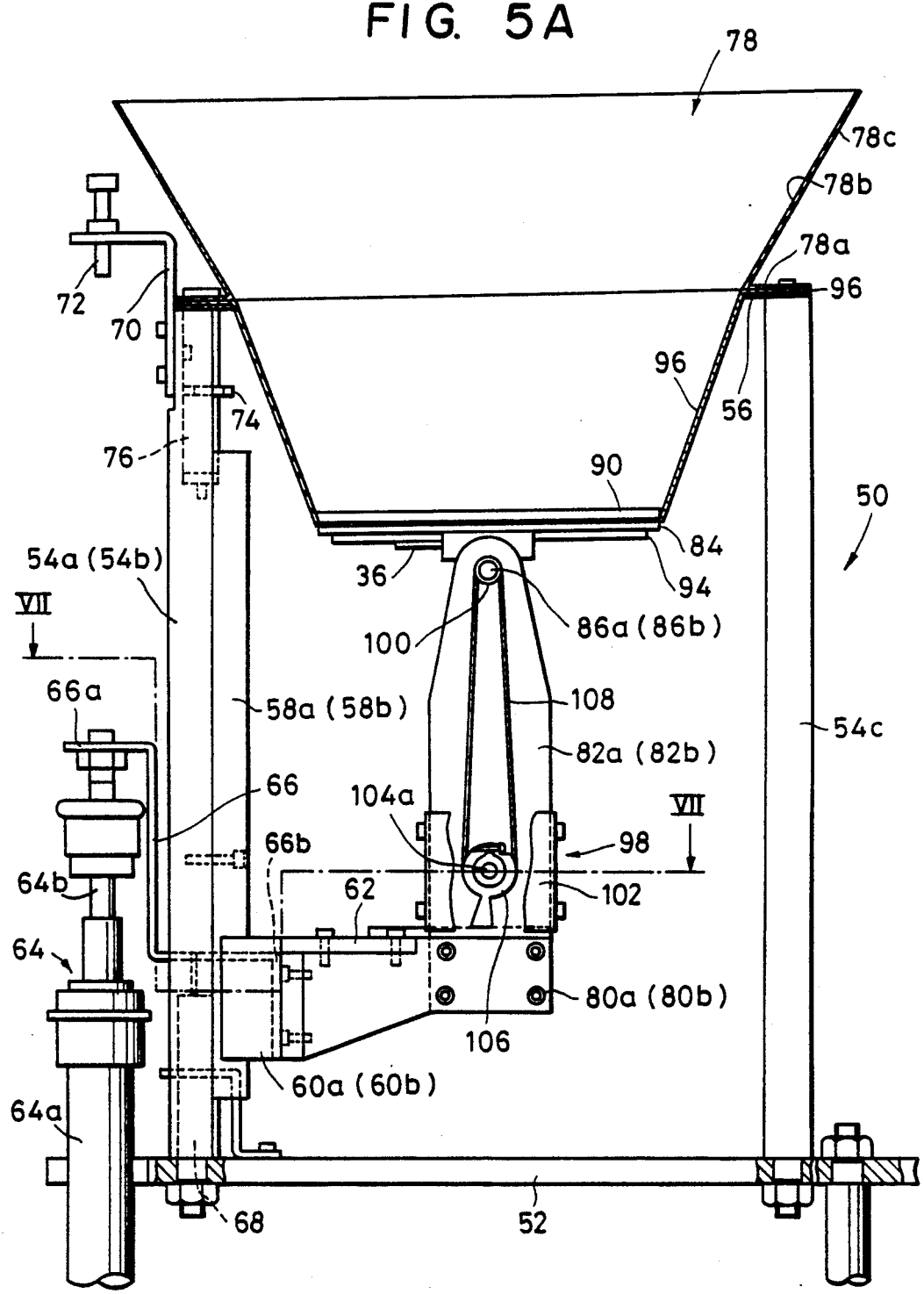
FIG. 5A is a front view showing the structure of another part isolating apparatus which is another embodiment of the present invention.
Figure 6:
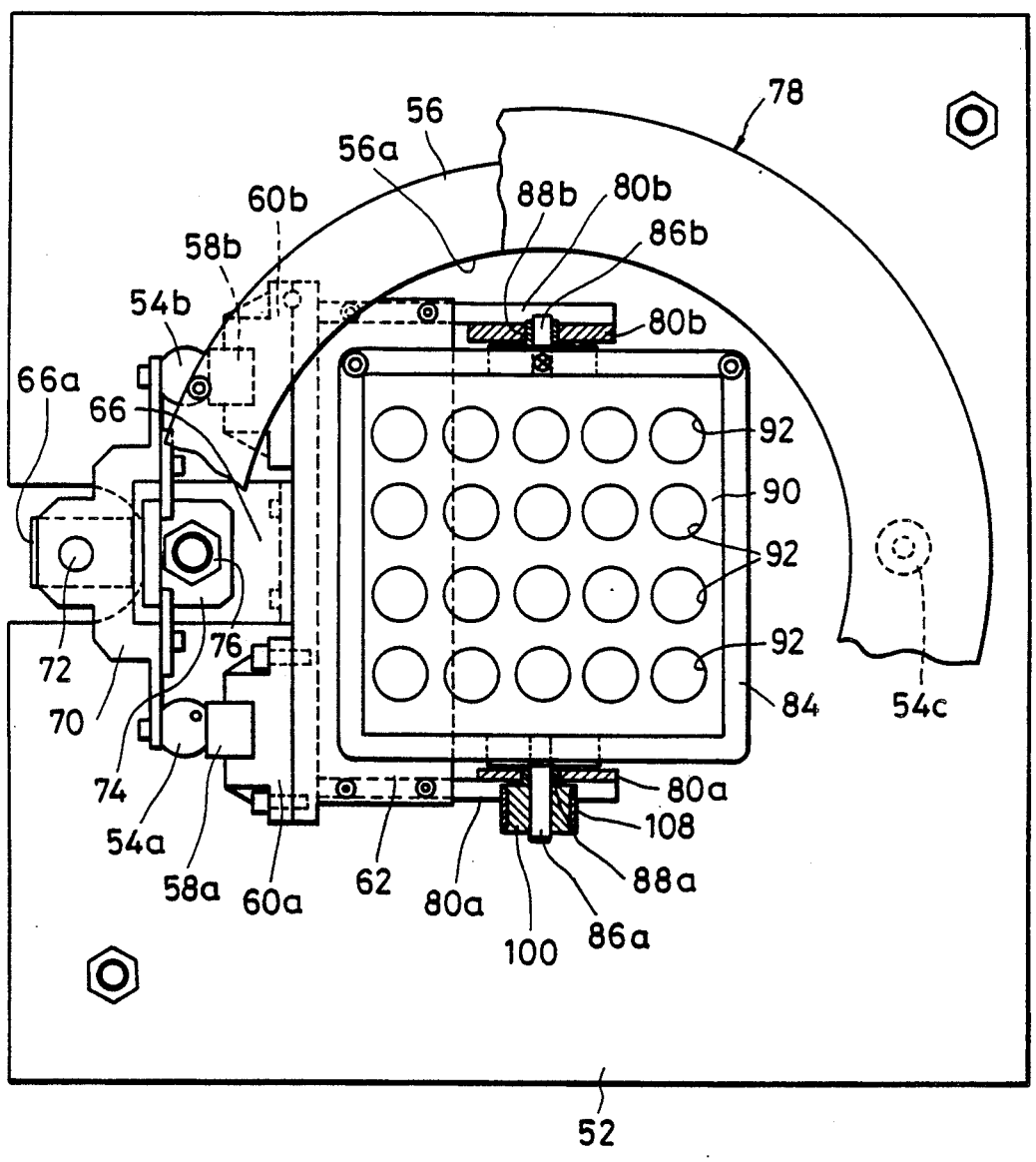
FIG. 6 is a fragmentary top view of the apparatus shown in FIG. 5A, showing an isolation table of the apparatus as being partially cutaway.

As shown in the front view in FIG. 5A, the part isolating apparatus 50, which is a second embodiment of the present invention, includes a base 52 disposed above a foundation, not shown. Three cylindrical columns 54a to 54c are set up on the base 52, with the columns 54a and 54b being shown on the left side of the figure, and the column 54c being shown on the right side of the figure. A ring-shaped mounting plate 56, best shown in FIG. 6, is secured to the upper ends of the columns 54a to 54c. The mounting plate 56 has a through hole 56a opening in the center thereof.

Two vertically-extending sliding rails 58a and 58b are secured to the inward peripheries of the left columns 54a and 54b, respectively. Sliding blocks 60a and 60b are slidably mounted on the sliding rails 58a and 58b, respectively. A vertically-movable plate 62 extends across and is secured to the sliding blocks 60a and 60b.

Figure 5B:
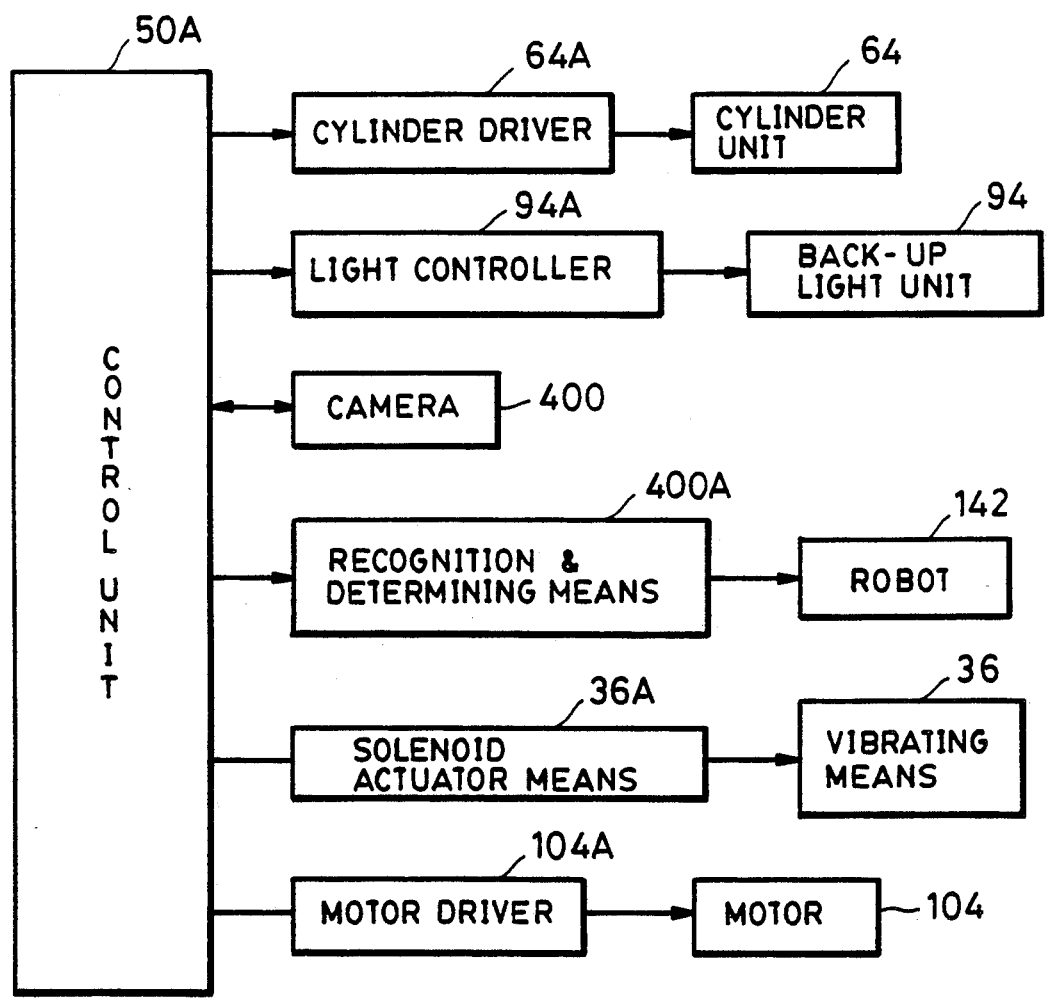
FIG. 5B is a block diagram showing the control of the apparatus shown in FIG. 5A.
Figure 7:
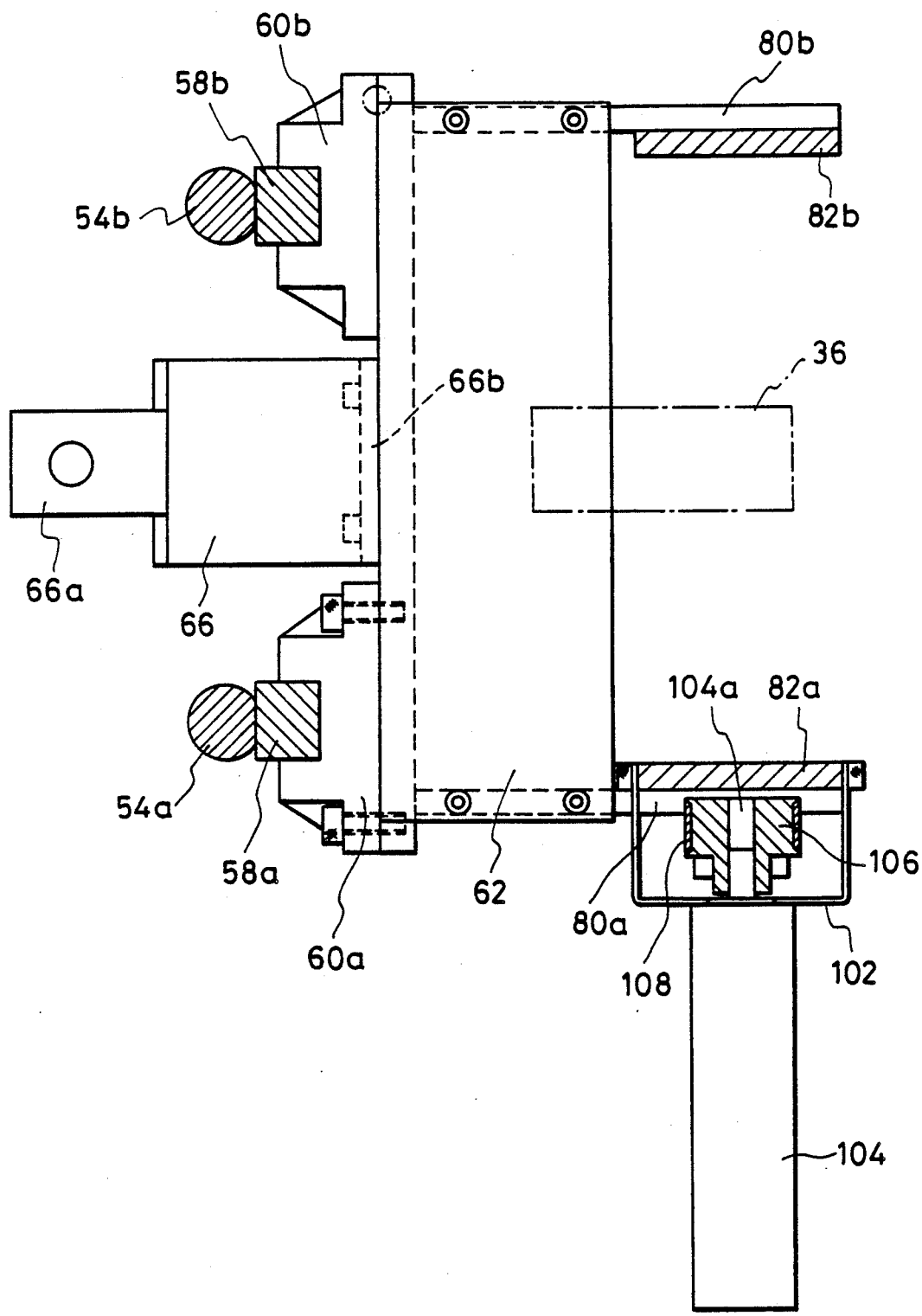
FIG. 7 is a transverse sectional view of the apparatus shown in FIG. 5A, taken along the line VII—VII shown in FIG. 5A.

A cylinder unit 64 for causing the vertical motion of the plate 62 is provided at a portion of the base 52 which is on the left side of the columns 54a and 54b, as viewed in FIG. 5A, and which is equidistant from these columns 54a and 54b. The cylinder unit 64 comprises a pneumatic cylinder body 64a, and a piston rod 64b which vertically reciprocates, i.e., advances from and retracts into the cylinder body 64a. The cylinder unit 64 receives an operation signal from a cylinder driver 64A, as shown in FIG. 5B. As shown in FIGS. 5A and 7, the upper end of the piston rod 64b is linked to the vertically-movable plate 62 via a generally L-shaped link 66 which has its end portions bent through 90 degrees to form mounting portions 66a and 66b. This link enables the piston rod 64b to move in unison with the vertically-movable plate 62.

As shown in FIG. 5A, the lowermost position of the vertically-movable plate 62 is roughly determined by a first shock-absorber 68 which is mounted to the base 52 and is capable of elastically abutting against the lower surface of a horizontal portion of the link 66. On the other hand, the uppermost position of the plate 62 is accurately determined by the abutment of the upper end of the piston rod 64b against a position-determining pin 72 mounted to a first supporting member 70 which, as shown in FIGS. 5A and 6, bridges the upper end portions of the columns 54a and 54b and is fixed to the outward peripheries thereof. The position-determining pin 72 is threaded into the first supporting member 70 in such a manner as to be able to vertically advance and retract, so that the uppermost position of the vertically-movable plate 62 can be adjusted.

A second supporting member 74 is mounted on the inward surface of the first supporting member 70. A second shock absorber 76 is mounted on an inward extension of the second supporting member 74. The second shock absorber 76 is capable of elastically abutting against the upper surface of the horizontal portion of the link 66 before the upper end of the piston rod 64b abuts against the lower end of the position-determining pin 72, so as to mitigate the shock at the time of the abutment of the piston rod 64b.

A substantially funnel-shaped isolation table 78 is mounted on the above-mentioned ring-shaped mounting plate 56. The isolation table 78 consists of an integral member comprising a ring-shaped base portion 78a formed with a configuration the same as the mounting plate 56, and a slope portion 78c whose inner surface forms a slope 78b inclining obliquely upward from the inner peripheral edge of the base portion 78a.

As shown in FIG. 6, extensions 80a and 80b are mounted on the vertically-movable plate 62. The extensions 80a and 80b project from the tip of the plate 62 and extend horizontally to a position exactly below the central through hole 56a defined by the ring-shaped mounting plate 56. A pair of vertically-extending members 82a and 82b, mutually opposed, are mounted on the extensions 80a and 80b, respectively. As shown in FIG. 5A, the length of these members 82a and 82b is such that, when the vertically-movable plate 62 is at its lowermost position, the upper ends of the vertically-extending members 80a and 80b are lower than the mounting plate 56 by a predetermined distance.

The upper end portions of the vertically-extending members 80a and 80b swingably support a frame 84 for supporting an isolation frame, which will be described later. Specifically, as shown in FIG. 6, the isolation frame supporting frame 84, which is a substantially square-shaped member, is supported in such a manner as to be swingable about rotary shafts 86a and 86b. These shafts 86a and 86b are mounted to, and outwardly project from, middle portions of the supporting frame 84 which face the vertically-extending members 82a and 82b. Bearing bushes 88a and 88b are respectively mounted on and extend through the upper end portions of the vertically-extending members 82 and 82b, and the shafts 86a and 86b are rotatably supported by the bearing bushes 88a and 88b, respectively.

An isolation frame 90, which is a substantially square-shaped member, is mounted on the supporting frame 84, with the four sides of the isolation frame 90 being supported by the supporting frame 84. As shown in FIG. 6, the upper surface of the isolation frame 90 has a plurality of part-isolating recesses 92 formed therein. In the illustrated embodiment, these recesses 92 consist of twenty recesses arranged in 4 rows and 5 columns. Each of the part-isolating recesses 92 has a configuration which corresponds to the configuration of the parts to be isolated. More specifically, the recesses have a circular configuration with a diameter slightly larger than the diameter of the parts to be isolated.

The isolation frame 90 is formed as a translucent dispersion plate. As shown in FIGS. 5A and 5B, a back-up light unit 94 connected to a light controller 94A is provided on the lower surface of the isolation frame 90, so as to project light onto the entire surface of the frame 90 from below. The isolation frame 90 is formed as a dispersion plate, and the back-up light unit 94 is provided on the lower surface of the frame 90. With this arrangement, when the parts 22 are isolated in one of the recesses 92, they are irradiated from below through the isolation frame 90, and a silhouette of the parts 22 is formed against the frame 90.

In this embodiment, a determination can be made as to whether the parts 22 are each isolated and received in one of the recesses 92. This determination is made, similarly to the foregoing embodiment, by photographing the entire isolation frame 90 with the isolated parts 22 by means of an image recognizing camera 400, and processing the resultant image to recognize the image of the parts 22 by means of a recognition and determining means 400A. During this image processing, the parts 22 isolated and received in one of the recesses 92 are silhouetted against the frame 90, thereby enabling a positive recognition of the image of the parts 22.

This effect may be clearly understood when consideration is given to the case where the isolation frame 90 is not formed as a dispersion plate, and no projection of light is effected by means of the back-up light unit 94. With this arrangement, when all or part of the surfaces of the parts 22 are coated with a reflective film, there is a risk that the light reflected by the surface of the parts 22 may hinder the entrance of the correct image into the camera 400. In contrast, as in this embodiment, if the images of parts 22 are silhouetted by light projected from the back-up light unit 94, that risk is avoided.

A vibrating solenoid serving as a vibrating means 36 is mounted on the lower surface of the back-up light unit 94, and it is connected to a solenoid actuator means 36A, shown in FIG. 5B. As shown in FIG. 5A, since the vibrating solenoid 36 is provided on the side of the light unit opposite from the light-projecting side, the solenoid 36 does not block the projected light.

The part isolating apparatus 50 further includes a bag member 96 for receiving therein a plurality of parts 22 to be isolated. The bag member 96 is mounted on the apparatus 50 in such a manner that its bottom is inserted between and held by the isolation frame 90 and isolation frame supporting frame 84, and the upper edge portion of the bag member 96 is inserted between and held by the mounting plate 56 and the base portion 78a of the isolation table 78. The bag member 96 is preferably formed of a flexible material that can also expand.

The isolation frame 90 is connected to a slanting means 98 for slanting the isolation frame 90 by a desired angle, relative to a horizontal plane. The slanting means 98 comprises a driven pulley 100, a mounting stay 102, a motor 104 consisting of a stepping motor mounted on the stay 102, a motor driver 104A connected to the motor 104, a driving pulley 106 integrally mounted on the drive shaft 104a of the motor 104, and an endless timing belt 108 disposed around the driving pulley 106 and the driven pulley 100. The driven pulley 100 is, as shown in FIG. 6, integrally mounted to the projecting end portion of the shaft 86a which is shown on the lower side in FIG. 6. The mounting stay 102 is, as shown in FIGS. 5A and 7, mounted to a lower portion of the vertically-extending member 82a which is shown on the lower side in FIG. 7.

With the above-described construction of the slanting means 98, when the motor 104 is started, the isolation frame 90 is slanted by the desired angle.

The part isolating apparatus 50 having the above-described construction performs an isolating action in the following manner.

First, a plurality of parts 22 of the same type which are to be isolated are charged into the bag member 96. After the charging, an isolating action command is input to a control unit 50A. In response to this command, the control unit 50A outputs signals to various means of the apparatus following the procedure described below, so as to effect an isolating action.

Initially, the vibrating means 36 is actuated, and it starts vibrating the isolation frame 90. Operating compressed-air is introduced to a first cylinder chamber at a lower portion of the cylinder body 64a of the cylinder unit 64, so as to cause the upward advancement of the piston rod 64b. In addition to the actuation of the vibrating means 36, the motor 104 is also actuated by the motor driver 104 which operates in response to an actuation signal supplied from the control unit 50A. The motor 104 causes, through the driving pulley 106, the timing belt 108, and the driven pulley 100, the isolation frame 90 to slant by a predetermined angle, e.g., about 5 degrees in this embodiment, relative to a horizontal plane.

Figure 8:
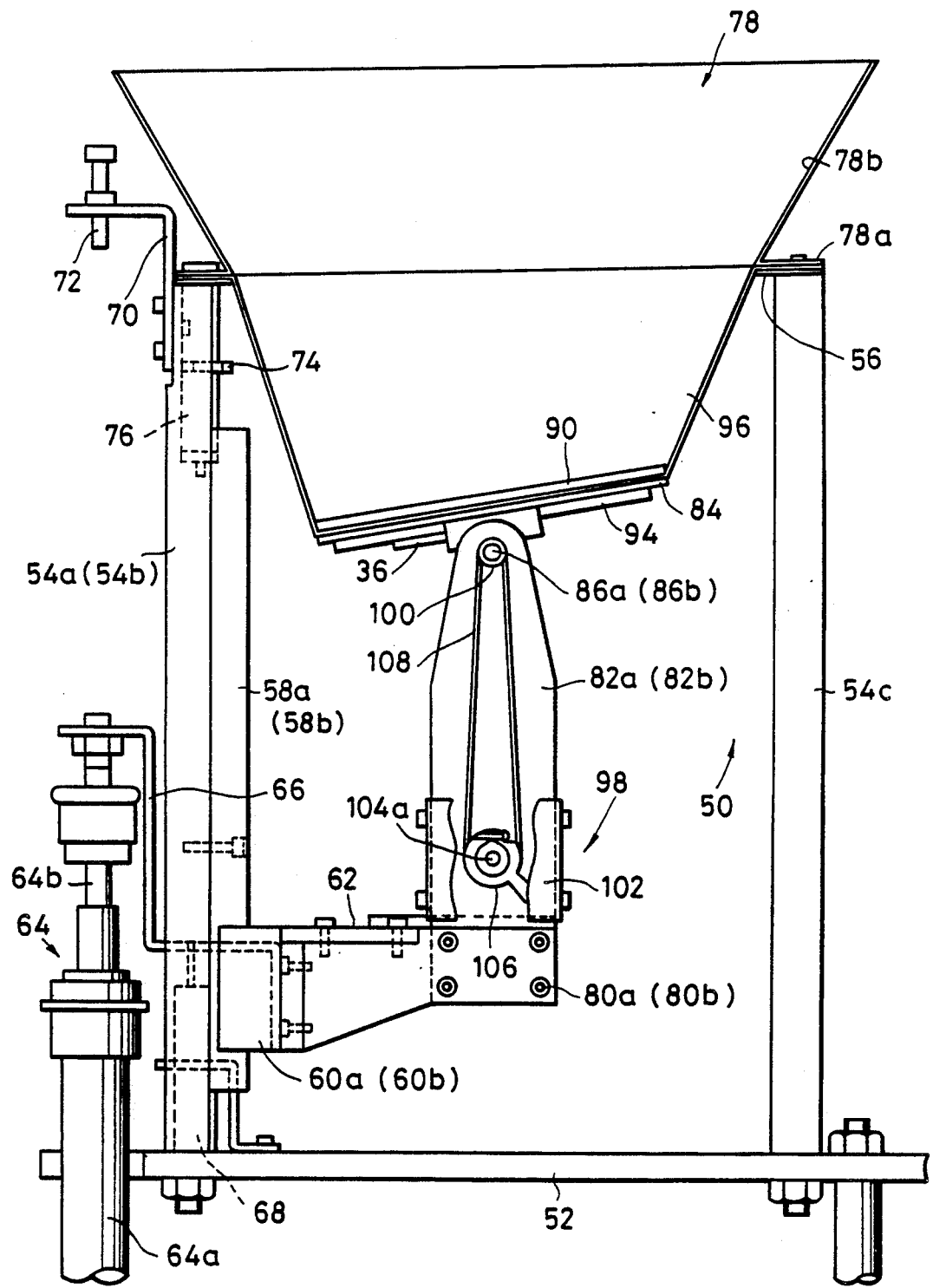
FIG. 8 is a view corresponding to FIG. 5A, showing a state where an isolation frame of the apparatus is slanted.
Figure 9:
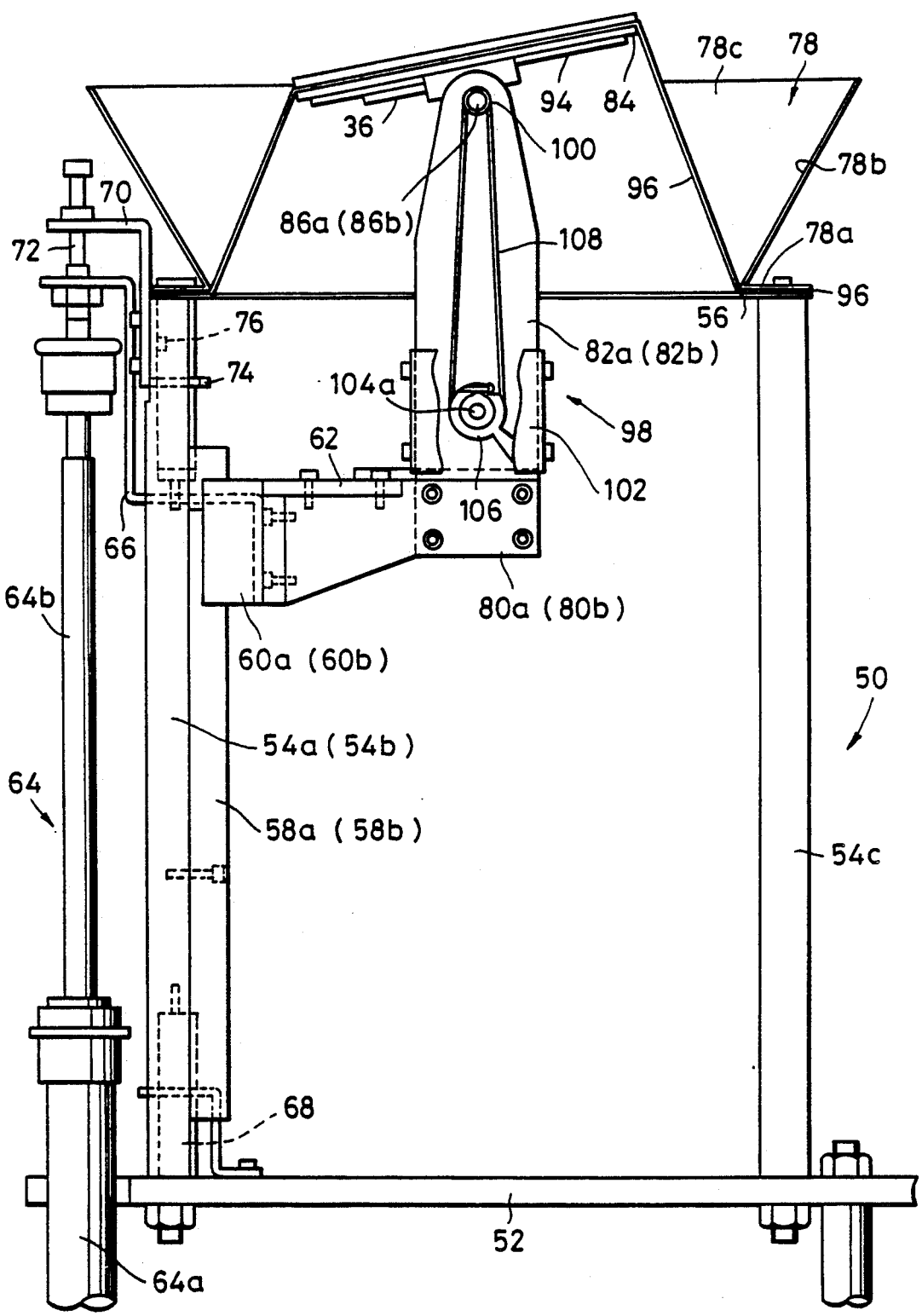
FIG. 9 is a view corresponding to FIG. 5A, showing a state where the isolation frame is at its uppermost position.

In this way, as the isolation frame 90 is being vibrated while in its slanted state, as shown in FIG. 8, the isolation frame 90 simultaneously ascends from its lowermost position. The ascending of the isolation frame 90 causes the intermediate portion of the bag member 96 to be relaxed, and to be relaxed to the maximum degree when the isolation frame 90 passes through the central hole 56a of the mounting plate 556. Thereafter, as the isolation frame 90 ascends further, the intermediate portion of the bag member 96 gradually recovers its initial tense state. The isolation frame 90 ascends to its uppermost position at which, as shown in FIG. 9, the upper end of the piston rod 64b abuts against the lower end of the position-determining pin 72.

Although the bag member 96 at this uppermost position is slanted, the bag member 96, which is formed of an expandable material, remains tense. Even after the isolation frame 90 has ascended to its uppermost position, operating compressed-air is continuously supplied to the lower cylinder chamber in the cylinder body 64a of the cylinder unit 64, so as to maintain the isolation frame 90 at the uppermost position.

Until the isolation frame 90 ascends to its uppermost position, some of the parts 22 that are disposed on the slanted isolation frame 90 which is being vibrated are caused to drop from the isolation frame 90, while others subsequently drop into the recesses 92 and become isolated from one another. During this time, when one of the parts 22 drops into one of the recesses 92, another part 22 will be unable to fit into that recess, but may end up dropping into an empty recess or falling from the frame 90 completely.

In this way, as the isolation frame 90 ascends to its uppermost position, some of the parts 22 on the frame 90 fall into the bag member 96, while others find empty recesses 93 to fill and become isolated from the others. Those parts 22 which do not fall into one of the recesses 92 drop from the isolation frame 90 and stay in a space between the slope 78a of the isolation table 78 and the free portion of the bag member 96. When the isolation frame 90 has ascended to its uppermost position, the vibrating action of the vibrating means 36 is stopped, and the motor 104 is rotated in the reverse direction so as to return the isolation frame 90 to its horizontal state.

Thus, the part isolating apparatus 50 operates in such a manner that a predetermined number of parts from among all of the parts 22 charged in the bag member 96 become isolated and assume a predetermined attitude within one of the recesses 92 of the isolation frame 90. Thereafter, the isolated parts 22 on the isolation frame 90 are photographed by the image recognizing camera 400, and the resultant image is used by the recognition and determining means 400A to ascertain whether a single part is isolated in each of the recesses 92, and whether each part is isolated with a correct attitude. When the means 400A determines that only one part 22 is isolated in each of the recesses 92 and is correctly positioned, the parts 22 are removed therefrom by a robot 142, and are then conveyed to, e.g., a magazine, in which they are received.

After all the parts 22 isolated in the recesses 92 have been removed therefrom by the robot 142, the supply of operation compressed-air is re-directed to a second cylinder chamber at an upper portion of the cylinder body 64a of the cylinder unit 64. This supply of air causes the downward retraction of the piston rod 64b, which in turn causes the returning of the various associated members to the condition shown in FIG. 5A. As a result, the remaining parts 22 which have stayed in the space between the isolation table 78 and the bag member 96 roll on the declining slope 78b, and they then drop into the bag member 96 and onto the isolation frame 90.

Thereafter, a subsequent isolating action is effected, starting with the ascending of the isolation frame 90, so that some of the remaining parts 22 are each received in one of the recesses 92 and each isolated from the others.

Thus, similarly to the previous embodiment, this embodiment also enables a plurality of parts of the same type to be isolated from the others, and to be disposed with a predetermined attitude.

While the present invention has been described with respect to what is presently considered to be preferred embodiments, it is to be understood that the invention is not limited to the disclosed embodiments. To the contrary, the present invention includes all modifications and arrangements within the scope of the appended claims.

What is claimed is:

1. A part isolating apparatus comprising:
   an isolation table having an upper surface and a lower surface, with said upper surface having an upper edge portion defining an opening and said lower surface having a lower edge portion defining an opening, and said table including a bore extending from said upper edge portion to said lower edge portion and being defined by a sloping surface sloping inwardly toward said lower edge portion;
   bag means, mounted around said lower edge portion and disposed beneath said isolation table, for receiving therein a plurality of parts to be isolated when said bag means is lifted through the bore; and
   thrusting means disposed beneath said bag means for lifting said bag means through the bore and isolating at least one of the parts from other parts, wherein when said bag means is lifted the other parts not isolated by said thrusting means are contained within a space defined by said sloping surface and a portion of said lifted bag means.

2. A part isolating apparatus comprising:
   a bag member for receiving a plurality of parts, said bag member having a bottom portion and an upper edge portion;
   frame means for supporting said bag member;
   an isolation frame mounted on a lower inner surface of said bag member for supporting a part to be isolated;
   moving means, supported by said frame means, for raising and lowering said isolation frame between a descended position, wherein said bag member is suspended, and an ascended position, wherein said bag member is inverted and an isolated part is supported by said isolation frame; and
   an isolation table supported by said frame means and disposed above said bag member, said isolation table having a lower edge portion meeting said upper edge portion of said bag member, wherein said isolation table contains non-silated parts when in the ascended position, wherein said isolation table includes a main body portion defining a bore through which said isolation frame is movable, with said main body portion being sloped downwardly from an upper edge portion of said isolation table to said lower edge portion, said sloped portion of said isolation table allowing the parts contained within said isolation table to roll down said sloped portion and drop into said bag member when said isolation table is in the descended position.

3. A part isolating apparatus according to claim 2, wherein said isolation frame in the ascended position is vertically higher than said upper edge portion of said isolation table.

4. A part isolating apparatus according to claim 2, wherein said isolation frame has a plurality of recesses formed on an upper surface thereof and receives an isolated part in each said recess.

5. A part isolating apparatus according to claim 2, further comprising a light unit disposed beneath said isolation frame, wherein said isolation frame is translucent and said light unit projects light toward said isolation frame.

6. A part isolating apparatus according to claim 2, further comprising vibrating means for vibrating said isolation frame.

7. A parts isolating apparatus, comprising:
   containing means for containing a plurality of parts;
   an isolation member attached to said containing means, said isolation member having a part-isolating portion for receiving and isolating at least one of the parts in said bag member;
   vertical thrusting means for moving said isolating member up and down to isolate at least one part; and
   means for collecting parts which are not isolated in said part-isolating portion as said isolation member is moved upward by said vertical thrusting means, wherein the collected parts are contained in a space defined by an uplifted surface of said containing means and a sloping surface of said containing means.

8. A parts isolating apparatus according to claim 7, wherein said collecting means includes vibrating means for vibrating said isolation member so the parts not isolated in said part-isolating portion fall into said containing means.

9. A parts isolating apparatus according to claim 7, wherein said collecting means includes means for tilting said isolation member during upward movement of said isolation member by said vertical thrusting means so the parts which are not isolated by said part-isolating portion fall into said containing means.

10. A parts isolating apparatus according to claim 7, wherein said collecting means includes means for vibrating said isolation member and simultaneously tilting said isolation member during upward movement of said isolation member by said vertical thrusting means so the parts which are not isolated in said part-isolating portion fall into said containing means.

11. A parts isolating apparatus according to claim 7, wherein said vertical thrusting means including a vertically-movable plate, driving means for vertically driving said vertically-movable plate and a shock absorber for absorbing shock when said vertically-movable plate reaches its uppermost position.

12. A parts isolating apparatus, comprising:

a bag member for containing a plurality of parts;

an isolating member attached to said bag member, said isolating member being made from a light-transmitting material and having a part-isolating portion for isolating one of the parts from the plurality of parts;

vertical thrusting means for moving said isolating member up and down;

illuminating means for illuminating said isolating member so as to project the form of the isolated part when said isolating member has move upward to a predetermined level from a lower position; and means for identifying the form of the isolated part projected by said illuminating means.

13. A parts isolating apparatus according to claim 12, further comprising collecting means for collecting the parts which are not isolated in said part-isolating portion.

14. A parts isolating apparatus according to claim 13, wherein said collecting means includes vibrating means for vibrating said isolating member so the parts which are not isolated fall into said bag member.

15. A parts isolating apparatus according to claim 13, wherein said collecting means includes tilting means for tilting said isolating member after upward movement by said vertical thrusting means so the parts which are not isolated drop into said bag member.

16. A parts isolating apparatus, comprising:

a bag member for containing a plurality of parts, said bag member having an opening at its upper end and a bottom surface, an isolating member attached to said bottom surface and a part-isolating portion for isolating at least one part from the plurality of parts; and vertical thrusting means for moving said isolating member from a lower position upwardly toward the opening of said bag member, with said bag member and said isolating member cooperating to define a space for collecting parts which are not isolating in said part-isolating portion during the upward movement of said isolating member.

17. A parts isolating apparatus according to claim 16, further comprising vibrating means for vibrating the plurality of parts on said part-isolating portion during upward movement of said isolating member.

18. A parts isolating apparatus according to claim 16, further comprising tilting means for tilting said isolating member.

19. A parts isolating apparatus according to claim 16, further comprising a shock absorber for absorbing vibrations generated when said upwardly moving isolating member reaches its uppermost position.

20. A parts isolating apparatus according to claim 16, wherein an isolating member is made of light-diffusing material, and further comprising illuminating means for illuminating parts which have been isolated on said part-isolating portion.

21. A method of isolating a part from a plurality of parts which have been collected and for transferring the isolated part, said method comprising the steps of:

collecting the plurality of parts in a bag member having an opening at one end and having an isolating member attached to the other end, with the isolating member having a part-isolating portion for isolating at least one part;

positioning an assembly device for removing the isolated part from the part-isolating portion;

lifting the isolating member from a lower position towards the open end of said bag member;

isolating at least one part in the part-isolating portion from the plurality of parts during upward movement of the isolating member;

collecting the parts which are not isolated in a space defined by a portion of the bag member and a slanted surface proximate to the opening in the bag member; and removing the isolated part with the assembly device.

22. A method according to claim 21, further comprising the step of tilting the isolating member during upward movement of the isolating member.

23. A method according to claim 21, further comprising the step of identifying the form of the isolated part on the part-isolating portion.

24. A method of isolating a part for assembly, comprising the steps of:

preparing an assembly device for removing an isolated part;

collecting a plurality of parts in a bag member having an opening at one end and having an isolating member attached to the other end thereof, with the isolating member having a part-isolating portion for isolating at least one part from the plurality of parts;

lifting the isolating member from a lower portion towards the open end of said bag member;

isolating at least one part into the part-isolated portion during the upward movement of the isolating member; and removing the isolated parts from the part-isolating portion by the assembly device.

* * * * *

UNITED STATES PATENT AND TRADEMARK OFFICE
CERTIFICATE OF CORRECTION

PATENT NO. : 5,067,631
DATED : November 26, 1991
INVENTOR(S) : Tsuyoshi Baba

It is certified that error appears in the above-identified patent and that said Letters Patent is hereby corrected as shown below:

COLUMN 2:

Line 44, "base 12" should read --base 12.--

COLUMN 9:

Line 68, "non-silated parts" should read --non-isolated parts--.

COLUMN 10:

Line 63, "including" should read --includes--.

COLUMN 11:

Line 11, "move" should read --moved--.

Signed and Sealed this

Twentieth Day of April, 1993

Attest:

MICHAEL K. KIRK

Attesting Officer     Acting Commissioner of Patents and Trademarks